FIG. 1a

INVENTORS
LESTER R. ADAMS
ARTHUR F. COLLINS

FIG. 3

# United States Patent Office 3,160,858
Patented Dec. 8, 1964

3,160,858
CONTROL SYSTEM FOR COMPUTER
Lester R. Adams, Endwell, and Arthur F. Collins, Vestal, N.Y., assignors to International Business Machines Corporation, New York, N.Y., a corporation of New York
Filed Sept. 29, 1961, Ser. No. 141,663
8 Claims. (Cl. 340—172.5)

This invention relates to a control system for a computer and more particularly to a control system for providing overall control signals to a computer.

A computer routine operation may be considered as a series of microsteps. This invention provides a control matrix which performs a number of such microsteps automatically and provides means to examine or test each step; for example, to examine whether the step should be repeated, whether to seek the next instruction, or whether a succeeding microstep in the same series must be performed. The foregoing operations are performed by conditional branching operations which are controllable within the control matrix itself. Further, a control matrix is provided in which a control function is obtained in combination with a timing signal that indicates when that control function should be exercised.

A control matrix such as the foregoing thus provides control signals to the computer and automatically provides selection or conditional branching operations if certain conditions are or are not met. By means of this technique, an efficient, economical systemized control is provided for the computer.

Accordingly, it is a principal object of the present invention to provide an improved computer control system.

It is another object of the present invention to provide a control matrix arranged to provide an overall systemized control.

It is another object of the present invention to provide a control matrix for providing control signals to a computer in controlled time sequence.

It is another object of the present invention to provide an improved control system including means for providing conditional branching operations.

It is yet another object of the present invention to provide a control system utilizing magnetic cores as the logic elements.

It is yet another object of the present invention to provide a control system in which a number of sub-routine operations can be performed automatically.

It is another object of the present invention to provide a control system including self-checking circuits.

In the attainment of the foregoing objects, there is provide a control system comprising logic or switch elements arranged into four sections or submatrices. Each of the sections of the control matrix is arranged to be selectively gated to permit drivers to select designated elements. Switch elements are provided at the intersection of input lines and sense lines to initiate outputs in response to a timing means to provide control signals to designated points in the computer, and also address signals to select an address for the succeeding computer cycles. Groups of switch elements are arranged to provide control signals in response to the functional condition of the instant computer operation.

The foregoing and other objects, features and advantages of the invention will be apparent from the following more particular description of a preferred embodiment of the invention as illustrated in the accompanying drawings.

Figure 1A:
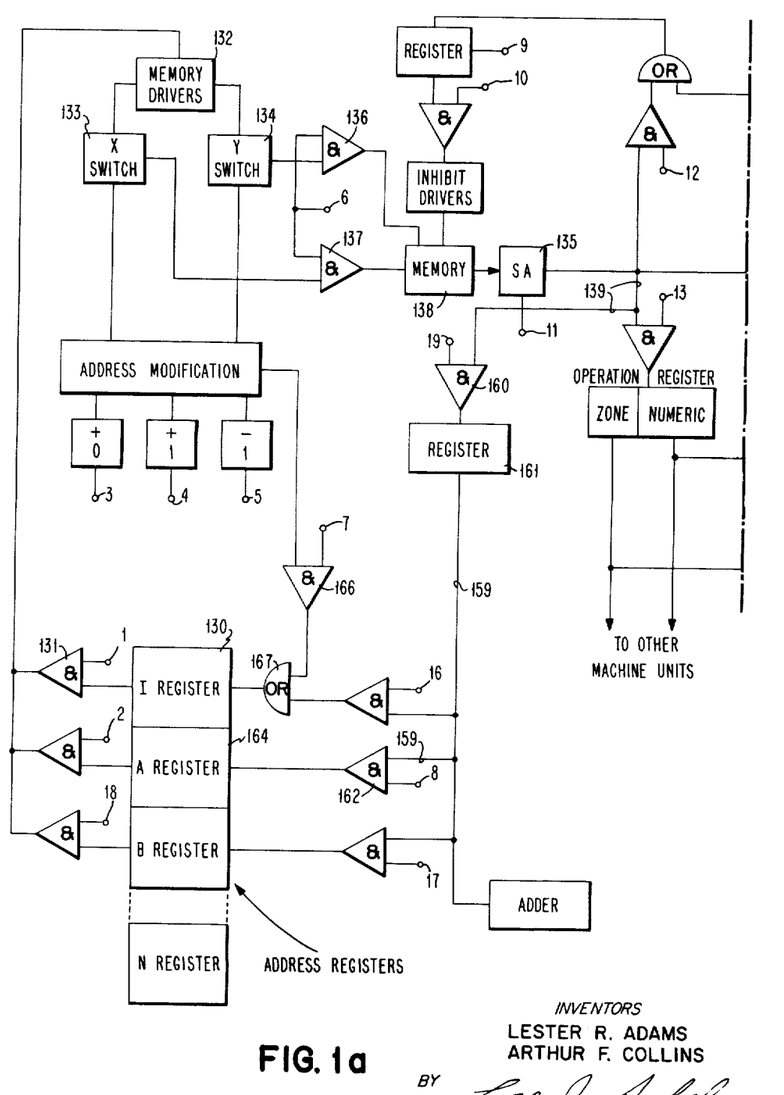
FIGS. 1a and 1b are block diagrams of a portion of an overall computer system including a control matrix according to the invention.
Figure 1B:
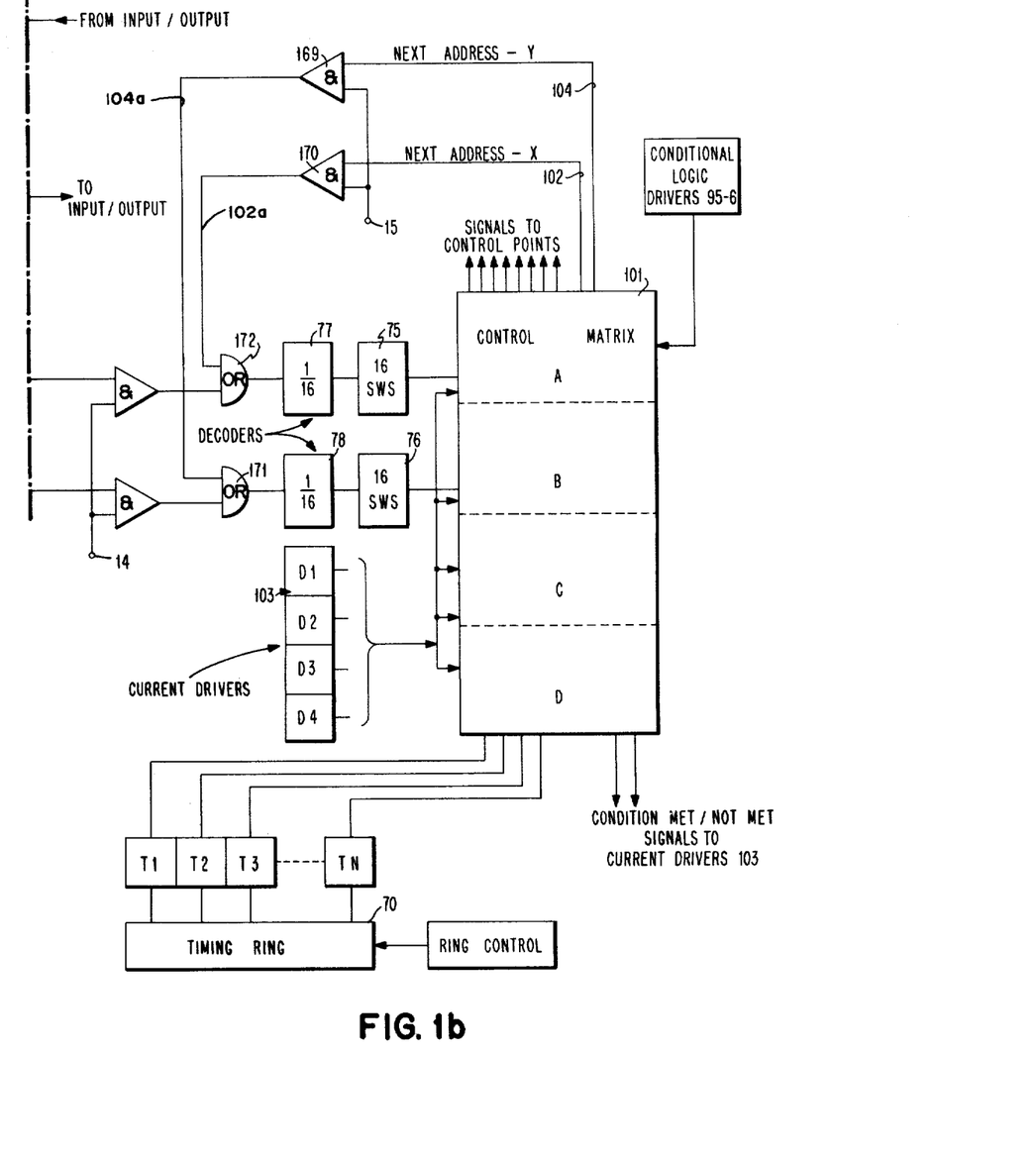

The control matrix 101, according to one preferred embodiment of the invention as indicated in FIG. 1b, includes four submatrices designated A, B, C and D; each submatrix includes positions for 256 rows of logic elements which may be, for example, bistable magnetic cores of any suitable type. The control matrix 101 provides control signals to the associated computer and address signals and functional condition signals to itself as will be described fully hereinbelow. Control matrix 101 is shown in more detail in FIGS. 2c–2f in which the cores are indicated by the slanted rectangles; note for example, the cores numbered 51–55. Cores are placed in selected positions to provide outputs during desired intervals, as will be explained in more detail hereinbelow. For simplicity in drawing only a few representative cores and the associated windings are shown in FIGS. 2c–2f; the practical embodiment includes a large number of cores and associated windings. Address input lines are indicated in drawings 2b–2f by the horizontal lines threading the cores; note, for example, lines 71 and 72 which thread the first row of cores in submatrix A. The direction in which the address lines thread the cores indicates a particular sense or state toward which a current flowing through the line will drive the core. Note that the input address lines are wound or thread all the cores in the same direction; for example, drive line 71 passes through all of the cores in row 1 of submatrix A in the same direction, bends back on itself, then passes through all of the cores in row 1 of submatrix C in the same relative direction (note also FIG. 3).

As will be explained more fully hereinbelow, the input address lines are energized to drive the selected cores to one stable state during a first or input time period and then the cores are reset or shift magnetic states during a later time period to provide an output signal; that is, to induce a signal on the associated sense lines.

Figure 3:
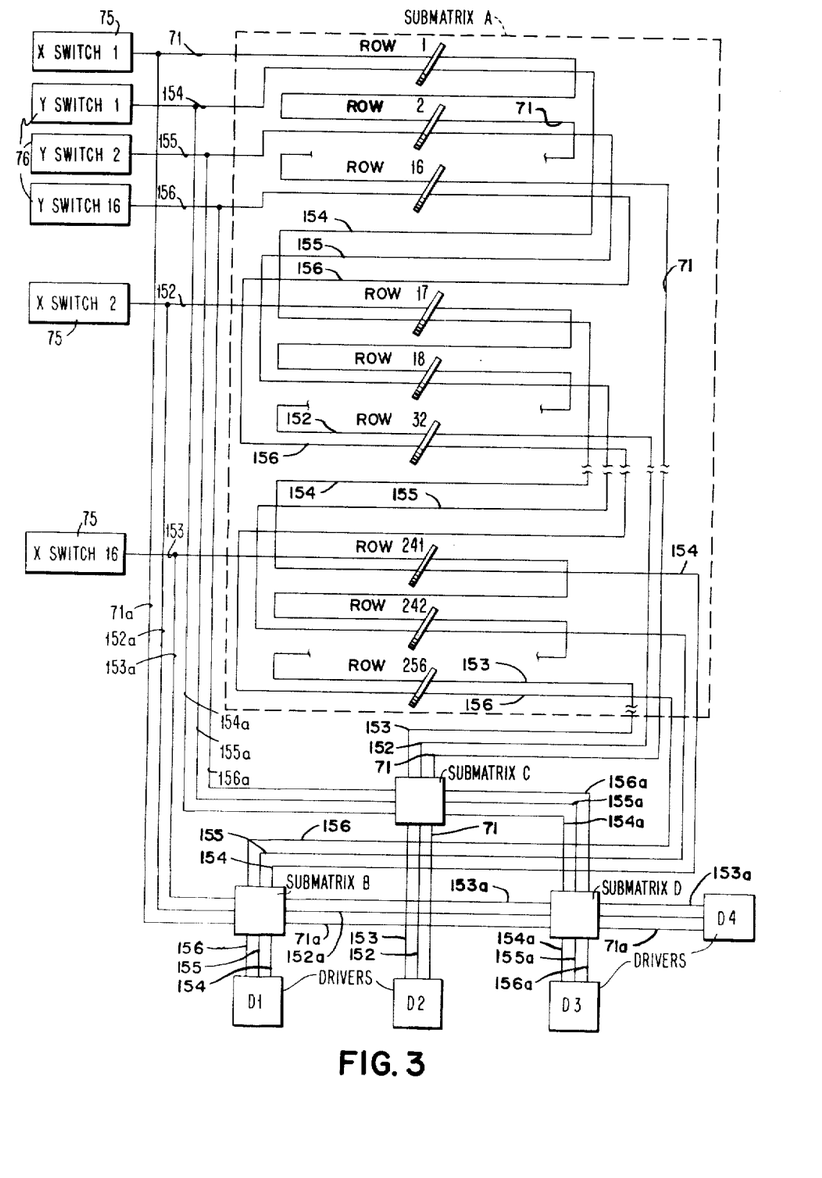
FIG. 3 shows the manner or pattern in which the address windings are wound in the control matrix of the invention.
Figure 4:
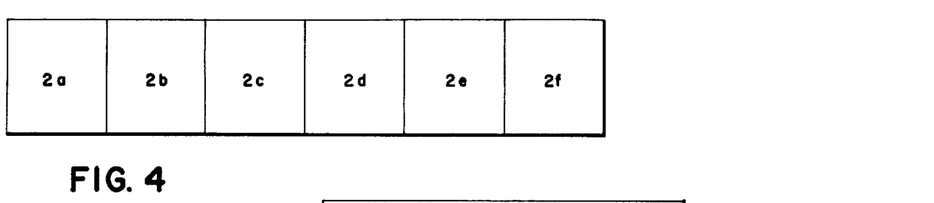
FIG. 4 shows the relative orientation of FIGS. 2a–2f.

The input address lines are driven during each operation period by two of a group of four drivers D1, D2, D3 and D4 collectively indicated as 103 which are connected to the input lines as shown in more detail in FIG. 3 and which will be described more fully hereinbelow. Each driver provides a half-select current to the associated input address lines; that is, a current which is half of the amplitude necessary to shift a core from one to the other of its stable states.

Two groups of current switches or gates 75 and 76 (see FIGS. 1b and 2b) of any suitable known type and which correspond to the X and Y factor addresses control the flow of current through the address lines, as will be described more fully hereinbelow. The current switches are, in turn, activated by respective decoders 77 and 78 of any suitable known type, each of which decodes an n-out-of-4 input to a 1-out-of-16 output for selecting the particular current switch. Diodes are connected in each of the address lines to insure unidirectional current flow through the lines; see, for example, diodes 73 and 74 connected respectively in lines 71 and 72.

Figure 2A:
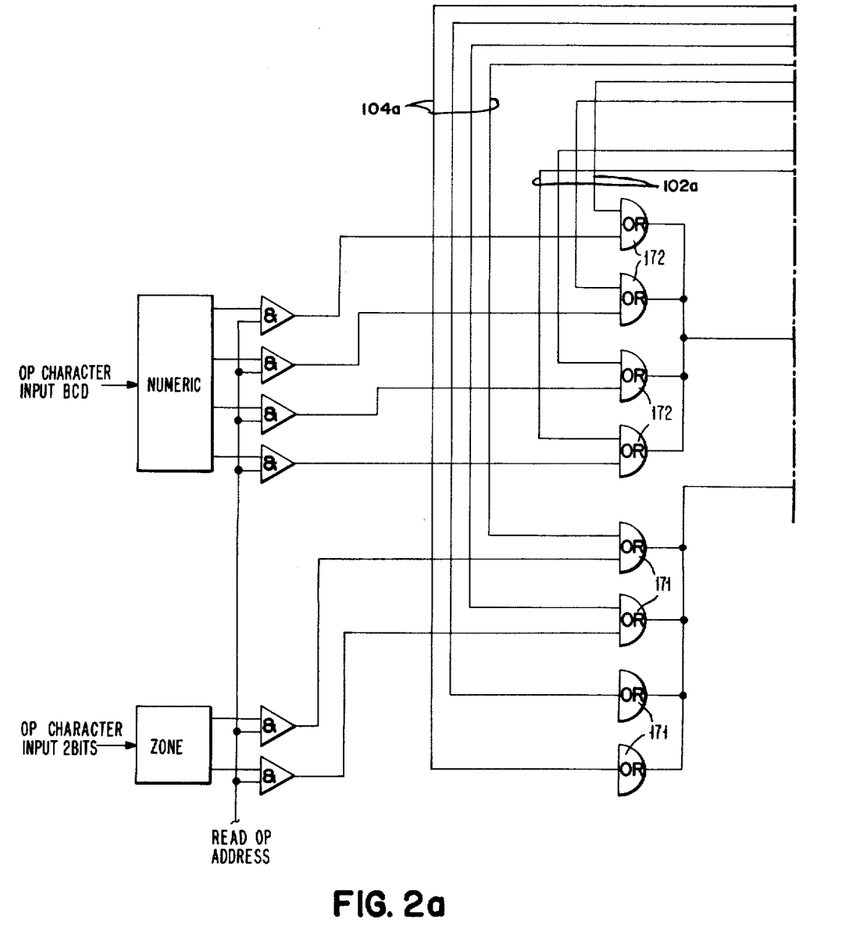
FIGS. 2a–2f show the control matrix of FIG. 1b in more detail.
Figure 2B:
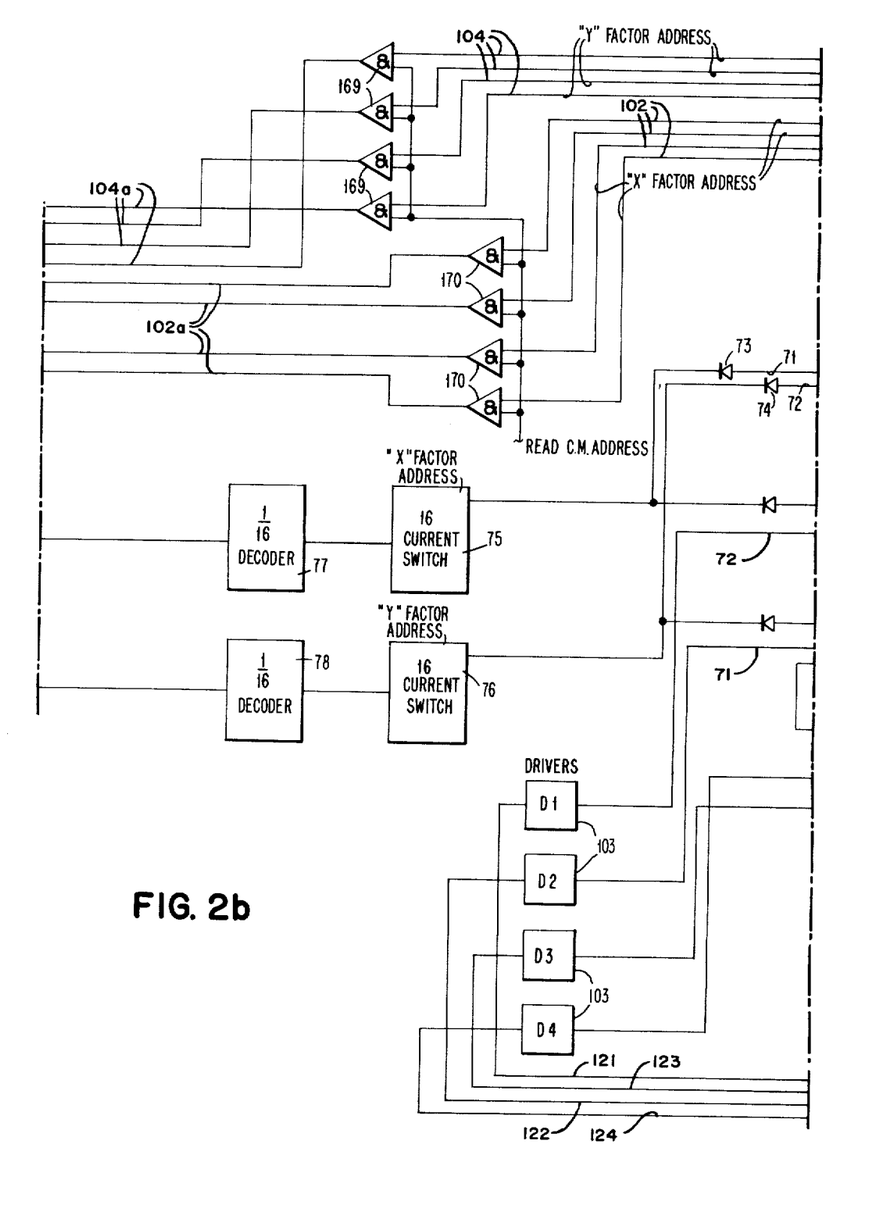
Figure 2C:
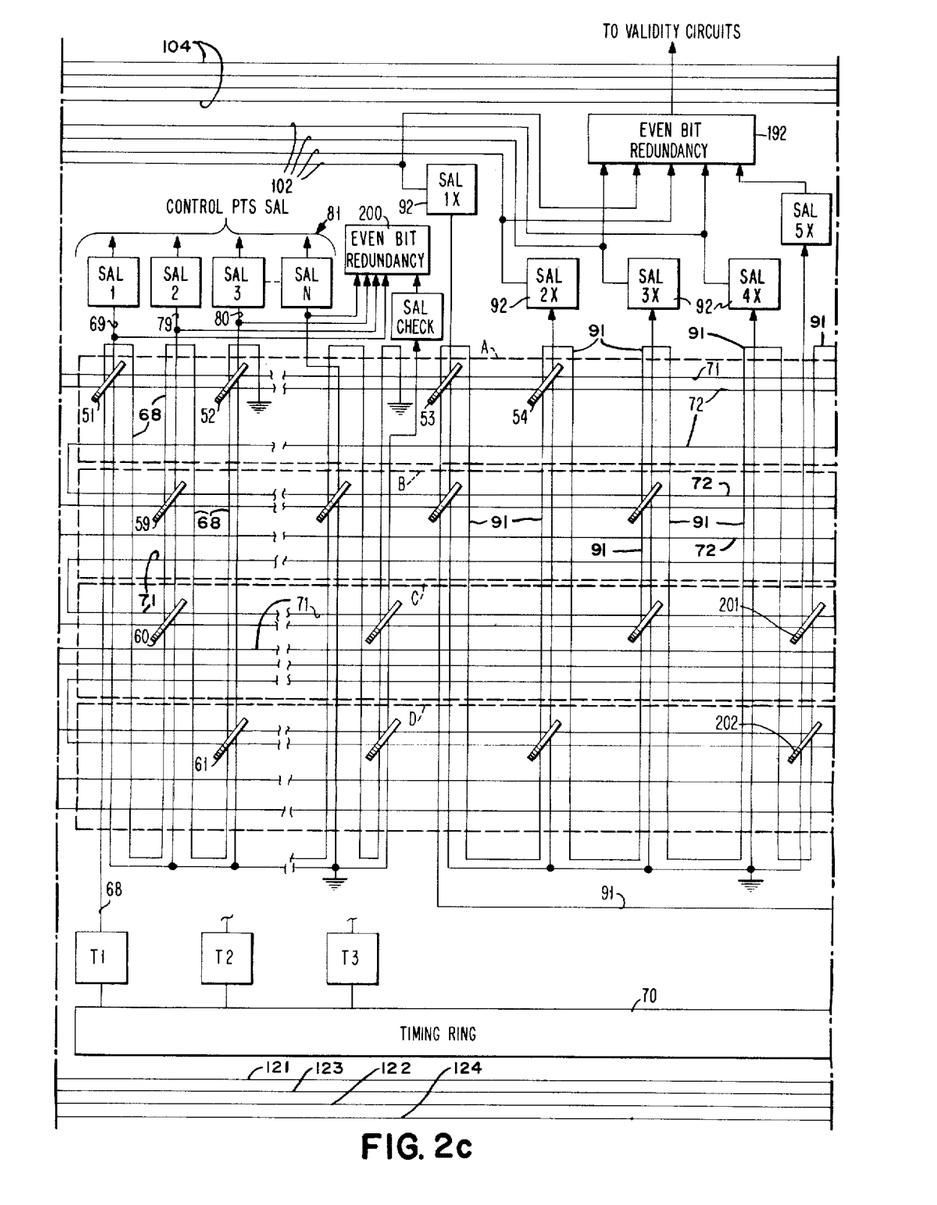

Each of the cores has an associated reset or readout line threaded therethrough; for example, line 68 is threaded or wound through cores 51, 60, 59, 61 and 52 in the various submatrices (see FIG. 2c). Each of the reset lines is connected to be energized by a timing ring 70, of any suitable known type, at different time intervals indicated by the blocks numbered T1, T2, T3 . . . TN, for purposes to be described hereinbelow.

Sense lines are wound through respective cores in the submatrices; see, for example, sense lines 69, 79, 80 (see FIG. 2c). One terminal of the sense lines 69, 79, and 80 is coupled to provide an output to respective control point sense amplifier latches which may be of any suitable type known in the art and which are indicated collectively as 81, and the other terminal is suitably grounded. The various impedances through which the windings are connected to ground reference are not shown since such are well known in the art. The sense amplifier latches 81 are, in turn, coupled to control points in the associated computer, as will be explained in more detail hereinbelow.

The last time interval in timing ring 70, indicated by block, i.e., time TN (FIG. 2d), is connected through a reset line 91 to drive cores which have their sense windings connected to the X factor address sense amplifier latches indicated collectively as 92 and individually as SAL1X . . . SAL4X (see FIG. 2c). The X factor address lines 102 are coupled through AND circuits collectively indicated as 170, lines 102A, and OR circuits collectively indicated as 172 to decoder 77. Likewise, block TN is connected through line 93 to a group of cores which have their sense winding connected to the Y factor address sense amplifier latches indicated collectively as 94. The Y factor address lines 104 are coupled through AND circuits collectively indicated as 169, lines 104A, and OR circuits collectively indicated as 171 to decoder 78.

For purposes to be described hereinbelow, the submatrices of the invention include conditional logic address control groups of cores indicated in FIGS. 2d, 2e, and 2f as CD1 and CD2, and numbered 95 and 96 respectively. These groups provide a signal output in response to the functional condition of the instant or current computer cycle. The various cores in the conditional groups 95 and 96 are arranged as pairs on particular address input lines and thus the address input current sets both cores in the same direction or sense; for example, note that input address lines 71 and 72 will set core pair 57 and 58 of group 95 in the same sense. A drive line under the control of respective drivers CDA, CDB, CDC . . . CDN for the conditional group 95 is wound through one core of each pair; for example, line 86 which is connected to be energized by driver CDA is wound through core 57 but is not wound through the other core of the pair, namely, core 58.

A respective sense line is wound through both cores of each pair; for example, sense line 87 is wound through both cores 57 and 58; however, note that the sense line 87 is wound through the two cores, 57 and 58, in relatively opposite sense. Sense line 87 has a terminal connected as one input to AND circuit 87A and its other terminal connected directly to a sense amplifier latch 88. AND gate 87A receives its other input through line 97 from timing block TN. The output of AND gate 87A is connected to sense latch 88. A second sense line 89 is wound through only one core of a pair; for example, line 89 is wound through core 57 but is not wound through core 58. Sense line 89 has a terminal connected as one input to AND gate 89A and its other terminal is connected directly to a sense amplifier latch 91; AND gate 89A receives its other input through line 97 from timing block TN. An output provided by timing ring 70 is coupled in parallel through line 97 to reset or readout the cores in both groups 95 and 96 at time interval TN. Sense amplifier latches 91 and 88 are prevented from being activated by the associated conditional logic drivers CDA . . . CDN by AND circuits 89A and 87A which are enabled only at time TN.

The conditional logic address group 96 is arranged in a similar manner as is conditional group 95. The placement of the cores in group 96 is arranged to provide additional conditional control signals, as will be explained hereinbelow.

The output of the condition met and the condition not met sense amplifier latches 88, 88A, 91 and 91A (see FIGS. 2d, 2e and 2f) determine in which of the submatrices A, B, C or D the next address is to be set up by controlling the activation of the four current drivers D1, D2, D3, and D4. More specifically, sense amplifier latches 91, 91A, 88 and 88A are connected respectively through lines 121, 122, 123 and 124 to drivers D1, D2, D3 and D4, indicated collectively as 103.

As indicated above, there are two groups of 16 switches, namely X factor address switches 75 and Y factor address switches 76. FIG. 3 shows the manner of winding the lines connecting each of the X and Y switches through the core matrix 101. The diodes, for example 73 and 74, connected to the input address lines as indicated in FIG. 2b are not shown in FIG. 3 to simplify the drawing. In FIG. 3, the individual X and Y switches 75 and 76 are shown separately and indicated as X switch 1, X switch 2, etc., and Y switch 1, Y switch 2, etc. X switch 1 is coupled by a line 71 to each of the first through 16 rows of cores in submatrix A. Note that line 71 is wound in the same sense through each of the cores in the first through 16 rows. Line 71 is coupled in the same manner through the first 16 rows of submatrix C and the other terminal of line 71 couples to driver D2. In FIGS. 2c-2f, for simplicity in drawing, line 71 is shown as passing through only the first row of cores in each of submatrices A and B but it will be understood to be wound as indicated in FIG. 3. X switch 1 is also connected through line 71a in a similar manner to submatrices B and D and the other terminal of line 71a couples to driver D4. X switch 2 is connected by a line 152 through the 17th through 32nd lines of submatrix A and through the 17th through 32nd rows of cores in submatrix C and terminates at driver D2. X switch 2 is also connected by a line 152a in a similar manner to submatrices B and D and terminates at a driver D4. Since the foregoing arrangement is repetitive for all of the X factor switches, the windings for X factor switches 3–15 are not shown for simplicity in drawing. X switch 16 is connected by line 153 to the 241st to 256th rows of cores in submatrix A, and in a similar manner to the 241st and 256th lines in submatrix C and the other terminal of line 153 couples to D2; X switch 16 is also connected by line 153a in a similar manner to submatrices B and D and terminates at driver D4.

Y switch 1 is connected by line 154 through the first, 17th and every succeeding 16th one of the cores in submatrix A and in the same manner through the cores in submatrix B; the other terminal of line 154 couples to driver D1. Y switch 1 is also connected by line 154a through the cores in submatrix C and D and terminates at driver D3.

Y switch 2 is connected by line 155 to the second, 18th and every succeeding 16th row of cores in submatrix A, and in a similar manner through the cores in submatrix B; the other terminal of line 155 couples to driver D1. Y switch 2 is also connected in a similar manner through line 155a to the cores in submatrix C and D, the other terminal of line 155a couples to driver D3.

Since the foregoing arrangement is repetitive for all the Y factor switches, the windings for Y factor switch 3-15 are not shown for simplicity in drawing. Y switch 16 is connected by line 156 through the 16th, 32nd, and every succeeding 16th row of submatrix A, and in a similar manner through the cores in submatrix B; the other terminal of line 156 couples to driver D1. Likewise, Y switch 16 is connected in a similar manner by line 156a through the rows of cores in submatrices C and D; the other terminal of line 156a couples to driver D3.

The operation of the control matrix 101 of the invention will now be described. Although the overall computer system, is per se, not a part of the invention, FIGS. 1a and 1b show a portion of an overall computer system in order to better explain the operation of the control matrix of the invention. To simplify the drawings, the output from the sense amplifier latches 82 from control matrix 101 are coupled as required to designated points in the computer by wiring, as indicated. The connections are indicated by numbering the terminals at the point to which the respective signals from the control matrix are coupled.

An instruction word is usually made up of an operation code, a data address or addresses, and additional operation modifiers. The control matrix of the invention is designed to handle the operation code in addition to modifying a succeeding operation as a result of functional conditions, which occur within the machine during an operation. In particular, the control matrix address is arranged in a unique pattern of cores which is set up at the beginning of a timing cycle to control the computer for the remainder of that timing cycle. A "timing cycle" is any definite time interval used in the computer system; in the embodiment shown, the timing cycle is a memory cycle which, in this case, is also a digit time.

The operation code is first entered into the operation register under control of a signal set up in the control matrix to thereby energize or set particular cores to one stable magnetic state to control the machine on the succeeding cycle. Cores are placed only at those intersections of the sense lines and the control matrix address line for the control points which need to be operated during this machine cycle.

When the cores which have been set are then reset, i.e., caused to shift magnetic states, they provide an output which is used to control various functions throughout the computer. At the end of the timing cycle, the cores will select the next matrix address input line if the operation has not been completed. The matrix address input line selected at the end of the timing cycle depends on the position at which the cores are placed on each address line. Internal or external conditions can select in which of the submatrices A, B, C or D the address input line is to be selected. Thus, conditional branching within a given subroutine or operation may be performed.

The next address to be set up and then scanned out is selected by a combination of 2-out-of-4 (2/4) current drivers D1, D2, D3 and D4 and a pair of 1-out-of-16 (1/16) current switches 75 and 76 which provide coincident current selection of one address. The pair of current switches 75 and 76 provide 1-out-of-256 row selection, while the drivers D1, D2, D3 and D4 select the submatrix A, B, C and D in which the address will be set up. If in the previous cycle no modifying conditions are present in the operation code read-in, drivers D1 and D2 drive current through submatrix A and the two selected current switches. This selects one of the 256 rows of cores in submatrix A and sets up sufficient cores to control the machine on the succeeding cycle. If, on the other hand, during the previous cycle, modifying conditions are present, two out of the four drivers D1, D2, D3 and D4 will drive current through another submatrix, namely, B, C, or D.

Assume now a specific example of operation, for example, assume that the first current switch in each of the groups 75 annd 76 is turned on, i.e., closed to conduct current. All cores, for example, cores 51-55, 57 and 58, through which the associated lines 71 and 72 pass in coincidence, will be shifted to a set state. At time T1 of the next cycle, reset winding 68 is energized by clock 70 to reset cores 51 annd 52 which were set by the two selected current switches. The resetting of the cores 51 and 52 develops an output on sense line amplifier latches SAL-1 and SAL-3, which latches are connected to control points in the machine. Likewise, at time T2, a reset winding, not shown, resets selected cores, not shown, that were set by the two selected current switches. The same operation is repeated through timing points T3-TN. Thus, the matrix provides time controlled signals for all control portions of the machine which are to be operated during this particular cycle.

In addition to the signals which may be generated to control the rest of the machine at time TN, there are groups of cores which are scanned out at this time to control the matrix itself; in other words they select the next matrix address.

The first two groups provide address output signals as binary coded decimal signals on the X and Y factor lines 102 and 104, respectively, which after going through respective AND circuits 170, 168; OR circuits 172, 171 and decoders 77 and 78, open current switches 75, 76 to allow the 1/256 row selection.

The 2/4 drivers D1, D2, D3 and D4 are operated by the two groups of cores 95 and 96 designated as the conditional logic address cores which are also scanned out at time TN. As noted above, the groups of conditional logic cores 95 and 96 alter the next control matrix address if conditional signals occur during scanning of the preceding control matrix address.

It is the combination of these drivers which determines which of the four submatrices will be selected for controlling the next computer cycle. Note that there are four matrices with 256 possible rows of cores in each matrix or a total of 4×256 or 1024 possible addresses.

If a succeeding cycle depends on the functional condition of internal or external modifiers, two cores placed on a given row are set by the input addressing currents; for example, cores 57 and 58 placed in row 1 of submatrix A would be set by input lines 71 and 72. The drive line 86 under control of the conditional driver CDA is wound through the first core of the pair, namely core 57, and if that particular condition is present, driver CDA resets core 57 to zero. Note that AND gates 87A and 89A, which are open only at time TN, will prevent core 57 from energizing sense latch 91 through sense line 89 at this time. When the second core of the pair (core 58) is reset by timing ring 70 at time TN, the sense line 87 which is wound in opposite sense through the two cores 57 and 58 will recognize that said condition is present. If the condition is not present, both cores 57 and 58 will be reset at time interval TN but the output of the two cores will cancel. The second sense line 89 which is wound only through core 57 will sense that the condition is not present because at readout time TN, the core 57 will still be reset to provide an output to sense amplifier latch 91 as the core is shifted or reset.

The conditional logic groups 95 and 96 are thus used to test when two conditions, in any combination, are to determine the next address. If, for example, neither of the two conditions is present, i.e., not met, sense amplifier latches 91 and 91A are energized at time TN by the associated cores and sense lines to activate drivers D1 and D2 through lines 121 and 122, respectively, to select the next address in submatrix A. If both conditions are present, i.e., met, sense amplifier latches 88 and 88A will be energized at time TN by the associated cores and sense lines to activate drivers 123 and 124, respectively to select the next address in submatrix D. As can be seen, various combinations of the condition-not-met latches 91 and 91A and condition-met latches 88 and 88A may be energized to selectively activate the drivers D1, D2, D3 and D4 to select the next address in one of the submatrices A, B, C or D.

If more than two functional conditions must be considered for selecting an address, addiitonal groups of conditional logic cores may be provided for controlling the activation of the associated drivers.

Some examples of conditional logic signals which could cause variation in the control matrix addressing are those indicating a program branch if (+), word mark, high, low, equal, overflow, error, carry, no-carry, etc. Note that such logic signals not only cause a program branch but also cause a branch in thet sequence of control matrix addresses which cause the instruction to be executed.

As a further example for understanding the operation of the control matrix 101 in relation to a computer system, and referring to FIGS. 1a and 1b as well as FIGS. 2a-2f, assume that initially an address has been entered into row 1 of the submatrix A, i.e., selected cores in row 1 of submatrix A have been set. At time interval T1, the selected cores in row 1 of submatrix A will be reset and couple an output signal to the respective sense amplifier latches 81. Assume SAL-1 is energized by its associated core to couple a signal to control point or terminal 1 to thereby read out the I address from I register 130 through AND circuit 131 and memory drivers 132, and X and Y switches 133 and 134. In order to simplify the drawings, lines connecting the signals from the control matrix 101 to the various control points are not shown, rather various control points are individually indicated as 1-19. At time interval T2, control points or terminals 6 and 11 will receive a signal from the associated core and sense latch, and the memory positions specified by the X and Y switches 133 and 134 will be sensed through AND switches 136 and 137 and memory 138 and read into sense amplifiers 135.

At T3, control point 4 will be energized to modify, i.e., "1-up" the I address 1. At T4, control points 8 and 19 receive a signal from matrix 101 and the information from memory 138 is read through sense amplifiers 135, line 139, AND circuit 160, register 161, line 159, and AND circuit 162 into the units position of the A address register 164. At T5, control point 7 receives a signal from matrix 101 and the "1-upped" I address is read into the I register through AND circuit 166, and OR circuit 167; at time TN control point 15 receives a signal and the next control matrix address, say A2, is read through AND circuits 169 and 170, OR circuits 171 and 172, into the 1 of 16 decoders 77 and 78. The assumed control matrix address A2 will load the tens position of the A address register and succeeding addresses, say A3-A8, would complete the loading of the A and B address registers. The next control matrix address, say A9, would cause the operation code to set up an address, say A100, in the control matrix. Address A100 would cause the character specified by the A address register to be read out and examined for its sign. If it is plus, a conditional driver will reset one of the two cores in the conditional address control area during a cycle, say T4. At time interval TN, condition-met sense amplifier 88 will select driver D3 and the next control matrix address will be row 1 in submatrix C. The signal from row 1 in submatrix C will cause the contents of the B address register to be transferred to the I address register and the control will then proceed to row 1 in submatrix A.

Figure 2D:
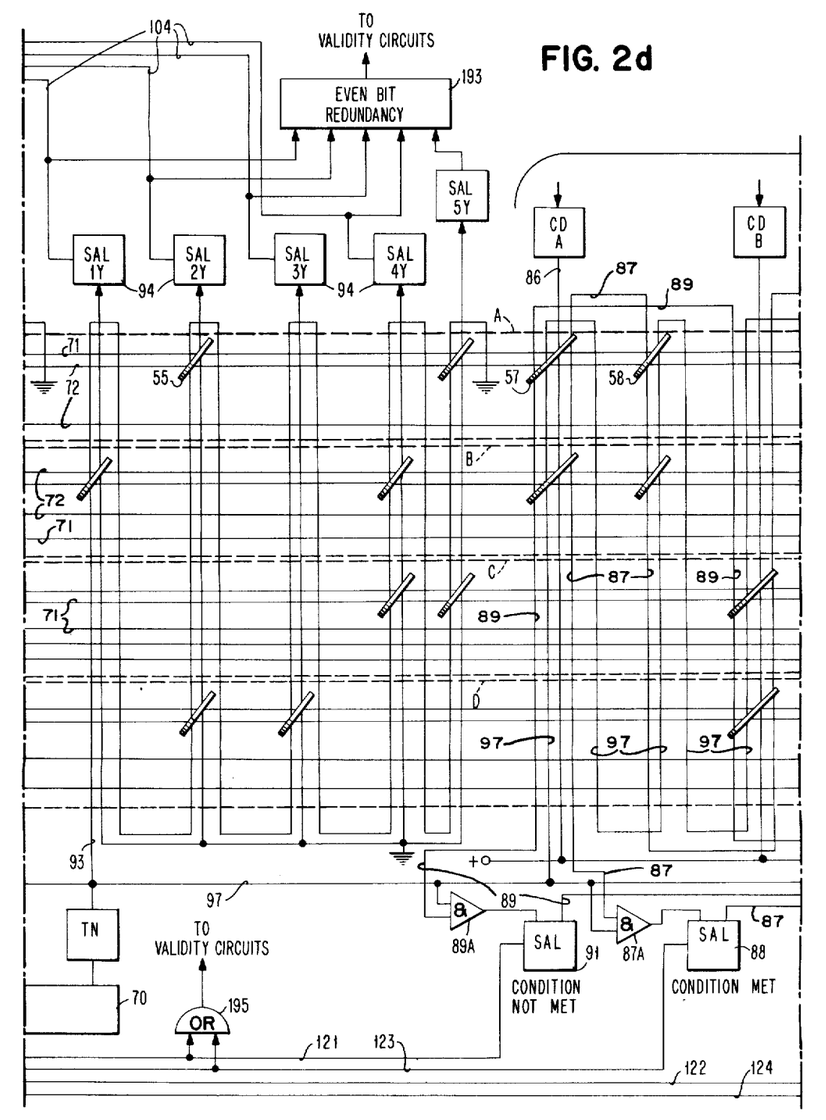
Figure 2E:
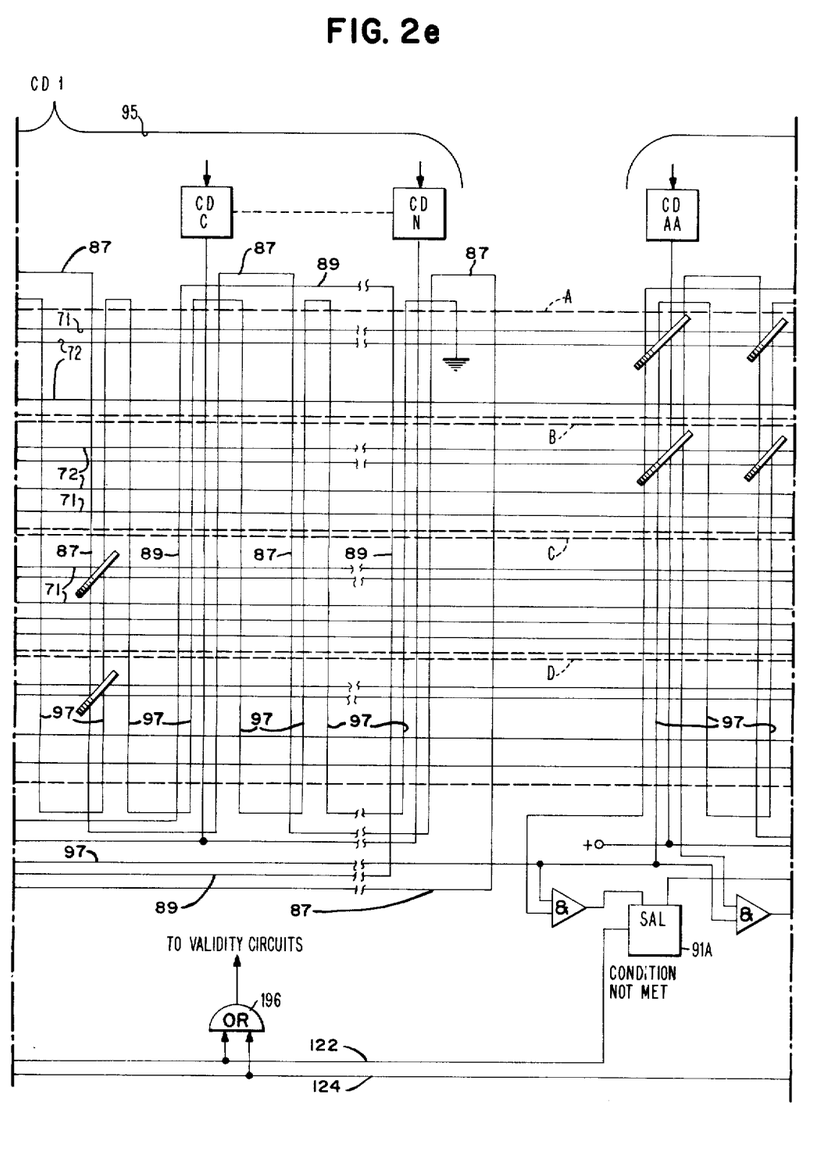
Figure 2F:
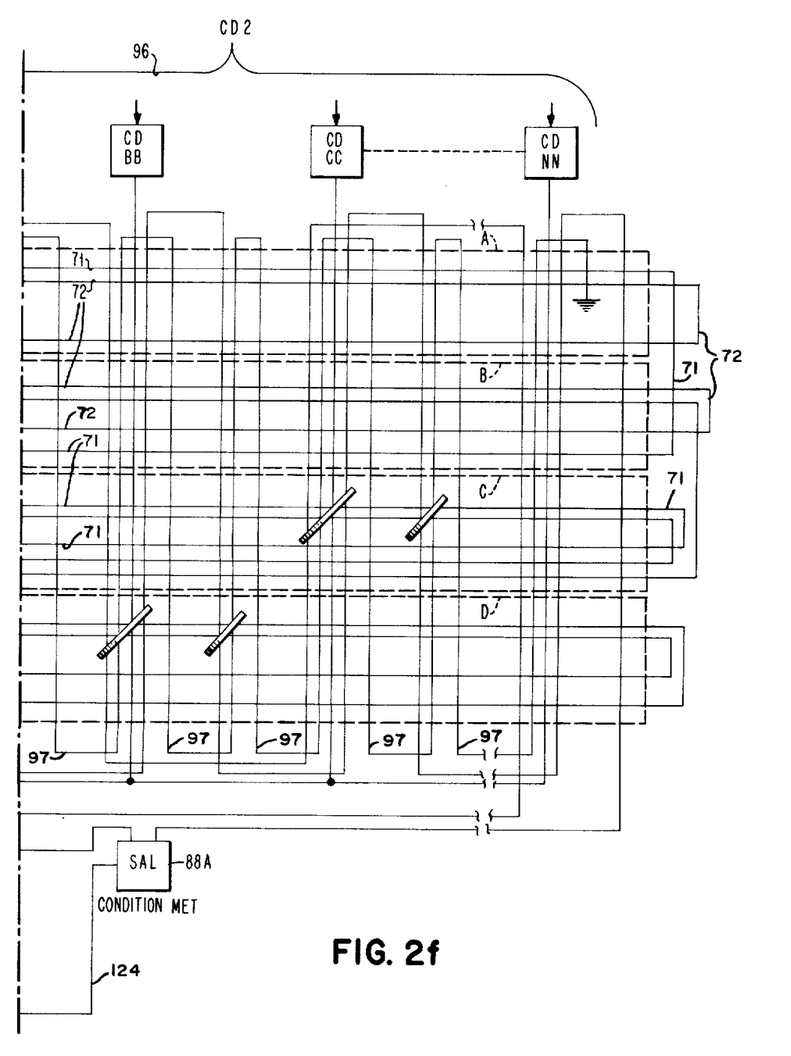

A validity check of the X and Y factor address output from the control matrix may be made by including for each factor address an additional sense amplifier latch, SAL5X and SAL5Y, respectively (see FIGS. 2c and 2d). As is known, to provide an even redundancy check, additional cores are provided at each address line; for example, cores 201 and 202, such that the number of cores associated with the X factor address in each row is an even number. The cores 201 and 202 energize the SAL5X. An even bit redundancy circuit 192 of any suitable known type and suitable known validity check circuits, not shown, check that two of the five sense amplifier latches SAL1X-SAL5X are energized concurrently. Likewise, SAL5Y is utilized to permit an even bit redundancy check for the Y factor addresses through even bit redundancy circuit 193 which is similar to circuit 192.

The output signals from the control point sense amplifier latches 81 may be checked in a similar manner as the X and Y factor address by including an even number of cores on each row, an additional sense amplifier latch indicated as SAL check, and the even bit redundancy circut 200 similar to circuit 192, and validity circuits, not shown, of any suitable type. Note that a sense amplifier check latch must be operably available at each of time T1 . . . T(N-1) to check the control point outputs during each time period.

Validity check may be made for the sense amplifier latches 88, 88A and 91, 91A associated with the conditional logic group of cores by connecting an exclusive OR circuit 195 across leads 121, 123, and an exclusive OR circuit 196 across leads 122 and 124. Exclusive OR circuits 195 and 196 may be of any suitable known type. An output is provided through the exclusive OR circuit 195 to a validity check circuit when one and only one output from one of the sense amplifier latches 88 and 91 is obtained. Likewise exclusive OR circuits 196 check that only one output from one of sense amplifier latches 88A and 91A is obtained.

The core matrix of the invention thus presents an organized control system allowing control logic to be performed in parallel, thus providing a simplified method of generation all control signals in a similar manner on each machine cycle. Reliability is increased and cost can be reduced due to a reduction in active components, although active components can be organized in a similar manner. Further, a matrix is provided which is self-cycling, shelf-checking, has control point timing, has the ability to branch, and provides overall system control.

While the invention has been particularly shown and described with reference to a preferred embodiment thereof, it will be understood by those skilled in the art that various changes in form and details may be made therein without departing from the spirit and scope of the invention.

We claim:

1. In a control matrix, first and second subgroups of bistable state cores arranged in pairs, address lines arranged to be energized for driving or setting said subgroups of cores, a first sense winding wound in relatively opposite directions through the cores of a selected pair, a second sense winding wound through only one core of each such selected pair, means responsive to a functional condition of resetting only the last-mentioned core of such selected pair to one stable state, and timing means for providing resetting energization to both cores of such pair at a given period subsequent to the operation of said functional condition to cause an output signal to be provided through said first sense line only if said functional condition is present and cause an output signal to be provided through said second sense line only if said functional condition is not present.

2. A control matrix comprising, in combination, at least two subgroups of bistable state elements arranged in pairs, address lines arranged to be energized for driving or setting the elements in the respective subgroups, a first sense winding wound in relatively opposite directions through each element of a plurality of associated pairs, a second sense winding wound through only one of the elements of each such associated pair, means responsive to any one of four potential combinations of two functional conditions for resetting to one stable state only the last-mentioned element of an associated pair of a corresponding one of the subgroups, and timing means for providing resetting energization to both elements of an associated pair of elements of such corresponding subgroup at a predetermined time, subsequent to the time by which at last one of said functional conditions should have occurred, to cause an output signal to be provided through the first sense line of a selected subgroup only if at least one of the functional conditions is present and cause an output signal to be provided through the second sense line of all of said subgroups provided none of the functional conditions is present.

3. A control matrix for a computer comprising, in combination, a plurality of submatrices each having positions for a plurality of switch elements arranged in groups and subgroups, means for selectively driving or setting to a first stable state groups of elements in selected submatrices in response to an input signal, timed means for selectively resetting to a second stable state a first subgroup of the set group at discrete time intervals for providing signals to control points in the computer, means for resetting a second subgroup of elements of the set group at a given time interval to provide address signals for a succeeding computer cycle, conditional means for resetting a third subgroup of elements of the set group in a first combination in response to functional conditions in the instant cycle, said timed means for providing resetting energization to said third subgroup of elements for resetting cores not set by said conditional means whereby another functional condition is indicatable, and means for coupling said functional condition signals for selecting the driving means and thus the submatrices to be operative during the succeeding computer cycle, means for coupling the address signal for selecting the switch elements to be set during the succeeding computer cycle whereby control for the succeeding computer cycle is provided wherein the cores in said conditional subgroups are arranged in pairs, and in which the associated conditional means reset one core in response to the presence of a given functional condition whereby the timed means reset only one core of a pair, and in which the timed means reset both cores when the given functional condition is not present.

4. A control matrix for a computer comprising, in combination, a plurality of submatrices each having positions for a plurality of switch elements arranged in groups and subgroups, means for selectively driving or setting to a first stable state groups of elements in selected submatrices in response to an input signal, timed means for selectively resetting to a second stable state a first subgroup of the set group at discrete time intervals for providing signals to control points in the computer, means for resetting a second subgroup of elements of the set group at a given time interval to provide address signals for a succeeding computer cycle, conditional means for resetting a third subgroup of elements of the set group in a first combination in response to functional conditions in the instant cycle, said timed means for providing resetting energization to said third subgroup of elements for resetting cores not set by said conditional means whereby another functional condition is indicatable, and means for coupling said functional condition signals for selecting the driving means and thus the submatrices to be operative during the succeeding computer cycle, means for coupling the address signal for selecting the switch elements to be set during the succeeding computer cycle whereby control for the succeeding computer cycle is provided wherein said conditional cores include two distinct subgroups each comprising pairs of cores, a pair of sensing devices, each pair of cores coupled to energize one and the other of associated sensing devices in response to the presence and absence of a functional condition signal respectively.

5. A control matrix for a computer comprising, in combination, a plurality of submatrices each having positions for a plurality of switch elements arranged in groups and subgroups, means for selectively driving or setting to a first stable state groups of elements in selected submatrices in response to an input signal, timed means for selectively resetting to a second stable state a first subgroup of the set group at discrete time intervals for providing signals to control points in the computer, means for resetting a second subgroup of elements of the set group at a given time interval to provide address signals for a succeeding computer cycle, conditional means for resetting a third subgroup of elements of the set group in a first combination in response to functional conditions in the instant cycle, said timed means for providing resetting energization to said third subgroup of elements for resetting cores not set by said conditional means whereby another functional condition is indicatable, and means for coupling said functional condition signals for selecting the driving means and thus the submatrices to be operative during the succeeding computer cycle, means for coupling the address signal for selecting the switch elements to be set during the succeeding computer cycle whereby control for the succeeding computer cycle is provided and including circuits for checking redundancy output, sense windings coupling outputs from switching elements to said redundancy check circuits whereby a checking circuit is provided.

6. A control matrix in accordance with claim 4, exclusive OR circuits coupled to monitor the output of each associated two of said sensing devices whereby a circuit is provided for checking that only one of each two associated sensing devices provides an output during each given period.

7. A control matrix for a computer comprising, in combination, a plurality of submatrices, each having positions for a plurality of rows of bistable magnetic cores having set and reset states, each core being shiftable from one to the other stable position in response to a full select amplitude current, X and Y factor address lines for each of said rows of cores, each row of cores being threaded by an X factor address line and a Y factor address line, a plurality of driver means for said matrix, said driver means being selectively connected to said address lines for providing a half-select amplitude current to each associated address line, a plurality of gate means for said matrix, said gate means being selectively connected to said address lines, said cores being shiftable to a set state by coincident current flow through the associated X and Y factor address line, reset lines selectively wound through groups of said cores, a timing ring coupling clock pulses through said reset lines for providing a resetting current to the associated cores at selected time intervals, sense lines for sensing a shift in states of said cores, a first group of cores arranged to provide output signals to control points in the computer, a second group of cores arranged to provide address signals to designate the address of the succeeding computer cycle, conditional modification groups of cores arranged in pairs, each of said conditional modification groups of cores including a condition-met sense winding wound in relatively opposite directions through the cores of a pair and a condition-not-met sense winding wound in the relatively same direction through one core of a pair, means responsive to a first functional condition for resetting the last-mentioned core of a pair of said conditional groups, output sensing devices coupled to each of said condition-met and condition-not-met sense windings, said timing means providing a reset current to said cores subsequent to the operating period of said functional condition, whereby if a first functional condition is met a first output signal is provided and if a second functional condition is met a second output signal is provided, means for coupling said functional condition signals from said conditional groups to said driving means to thereby select the driving means to be activated during the succeeding computer cycle by driving cores in the submatrix which is to operably control the succeeding computer cycle, and means for coupling the address signal from said second or address group of cores to said gate means for selecting the cores in the selected submatrix which are to be driven during the succeeding computer cycle whereby complete control for the succeeding computer cycle is obtained.

8. A matrix in accordance with claim 7 in which said conditional modification groups comprise two groups of cores, the condition-met signal from each conditional group couples to a respective driver means and the condition-not-met signal from each conditional group couples to a respective driver whereby various combinations of driver means for driving said submatrices is obtainable by the functional condition signals.

References Cited in the file of this patent

UNITED STATES PATENTS 3,015,092     Legall     Dec. 26, 1961
3,021,511     Vinal     Feb. 13, 1962